S. A. STRICKLAND.
PUMP FOR MOTOR VEHICLES.
APPLICATION FILED DEC. 13, 1915.
1,294,564.
Patented Feb. 18, 1919.
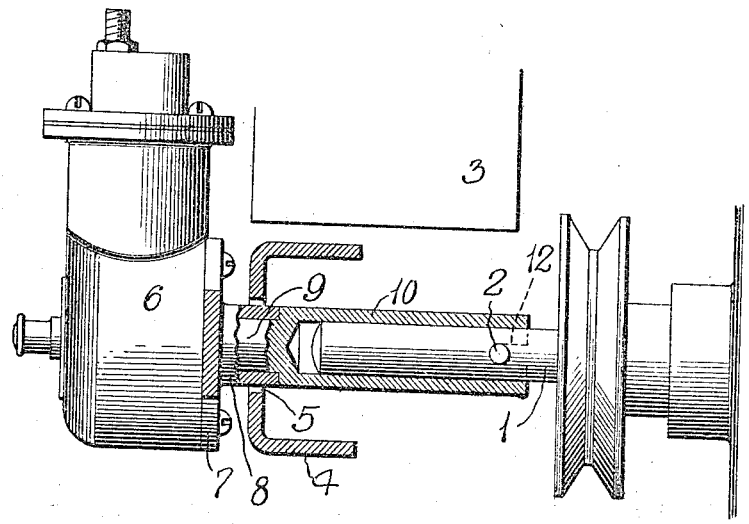
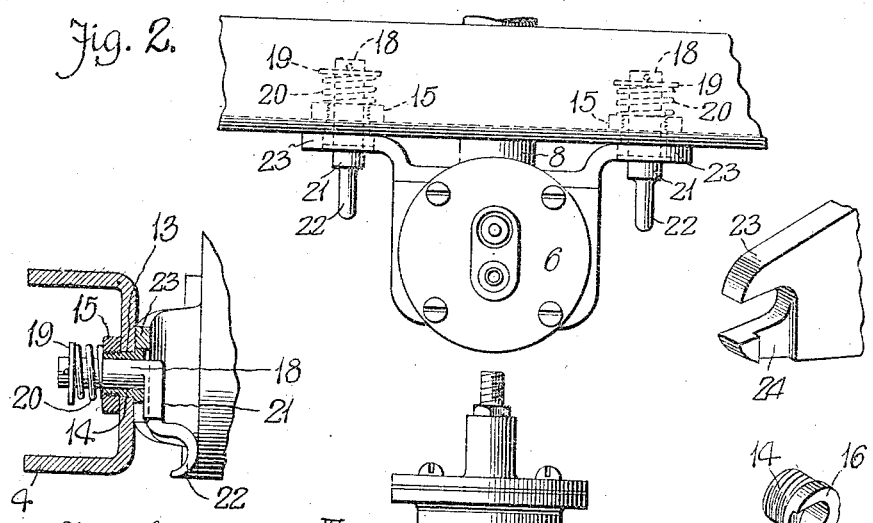
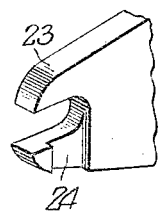
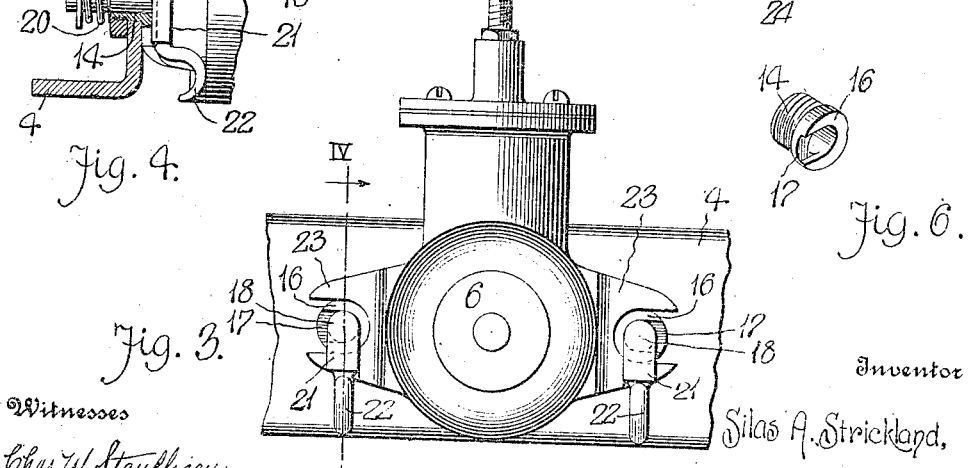
Witnesses
Chas. W. Stauffer
Anna M. Dorr
Inventor
Silas A. Strickland,
By
Attorneys

UNITED STATES PATENT OFFICE.

SILAS A. STRICKLAND, OF DETROIT, MICHIGAN.

PUMP FOR MOTOR-VEHICLES.

1,294,564.      Specification of Letters Patent.      Patented Feb. 18, 1919.

Application filed December 13, 1915. Serial No. 66,513.

*To all whom it may concern:*

Be it known that I, SILAS A. STRICKLAND, a citizen of the United States of America, residing at Detroit, in the county of Wayne and State of Michigan, have invented certain new and useful Improvements in Pumps for Motor-Vehicles, of which the following is a specification, reference being had therein to the accompanying drawings. Patent No. 1,050,977, granted to me Aug. 24, 1915, discloses a pump for motor vehicles and a manner of supporting the pump relative to its operating means. As shown in this patent the pump is detachably connected to a suitable support, as the front end bearing or transverse member of a chassis, consequently the pump supporting element of the chassis has a fixed relation relative to the motor shaft of the vehicle. It has been found among a large number of types of motor vehicle that the relation between an engine shaft and the chassis element varies, consequently it was necessary for me to devise some means by which an air pump, such as disclosed in my prior patent, could be held in operative relation to an engine shaft where the engine shaft and bearing were out of alinement or where the opening in the chassis element could not be employed as a bearing for the pump. In contradistinction to the manner of supporting the air pump or attaching it to a chassis element as heretofore disclosed, I discovered that the air pump could just as well be supported solely by the engine shaft and some provision made for preventing bodily rotation of the pump when in actual operation.

To this end, I provide a pump shaft with a rigid and preferably integral coupling member which can be easily and quickly fitted over the end of an engine shaft whereby the pump may be driven thereby, said member passing loosely through the opening in the chassis element, such as the frame cross member or in some instances through the opening in the radiator or other member, and being supported solely upon the end of the engine shaft. I then provide novel means for preventing the pump from bodily rotating, and such means is simply employed for this purpose, without necessarily supporting any part of the air pump. Therefore the air pump is solely supported by the engine shaft employed for operating the pump, and consequently can be used in connection with vehicles where it would be practically impossible or at least inconvenient to use the pump connection and support disclosed in my prior patent.

The present invention will be better understood when reference is had to the drawings and the detail description thereof disclosing the preferred embodiments of my invention, but it is to be understood that the structural elements are susceptible to such variations and modifications as fall within the scope of the appended claim.

In the drawings,

Figure 1 is an elevation of an air pump, a portion of an engine shaft, a portion of a chassis, the latter being in section and a portion of the pump broken away and in section;

Fig. 2 is a plan view of the same;

Fig. 3 is a front elevation of the same;

Fig. 4 is a cross sectional view taken on the line IV—IV of Fig. 3;

Fig. 5 is a perspective view of a portion of a pump ear;

Fig. 6 is a perspective view of the detached keeper;

The drawings show portions of a motor vehicle, as an engine or motor shaft 1 having a transverse pin 2 adjacent the outer end thereof; a portion of a radiator 3, and a chassis element, such as a transverse channel member 4 having an opening 5 in approximate axial alinement and in proximity to the outer end of the engine shaft 1, or in other forms of construction the opening through which the starting crank for turning the engine shaft, may be in some other member of the chassis than the channel member as when said opening is in the body of the radiator.

Referring now to Figs. 1 to 6 inclusive, an air pump 6 is associated with the above elements, said air pump having a back plate 7 provided with a bushing 8 adapted to extend into the opening 5 of the channel member 4. The bushing 8 constitutes one of the bearings of a pump shaft and the rear end of said pump shaft terminates in a rigid and integral coupling socket 10, having the rear end thereof slotted, as at 12, whereby the coupling socket can be slipped on the end of the shaft 1 and placed in engagement with the pin 2 thereof for rotative continuity with the engine shaft. The outer end of the engine shaft and the coupling socket 10 are of sufficient length whereby after the air pump is placed in engagement with the engine shaft said shaft constitutes the sole means of supporting said air pump and this constitutes an important feature of my invention.

It is now apparent that if the engine shaft 1 be driven, that the air pump would be bodily rotated, and to prevent such movement of the air pump and permit the shaft 9 to perform its usual function in connection with the pump, I have devised means in connection with the plate 7 and the channel member 4 for holding the pump practically stationary. Such means however does not constitute a support for the pump, as said pump is solely supported by the engine shaft, but simply maintains the pump in an operative useful position.

The channel member 4, contiguous to the opening 5, has openings 13 to receive keepers in the form of bushings 14. The inner ends of the bushings are exteriorly screwed-threaded to receive nuts 15 and the outer ends of said bushings terminate in cylindrical heads 16 having radially disposed grooves 17 in communication with the bores of said bushings.

Slidable in the keepers of the channel member 4 are retaining members comprising pins 18 having the inner ends thereof provided with abutments 19 for coiled compression springs 20 encircling the inner ends of the pins 18, said springs holding the retaining members in a retracted position.

The outer ends of the pins 18 terminate in cranks 21 having finger pieces 22 and said cranks are normally held in engagement with the heads 16 of the keepers and in the grooves 17 of said heads, thereby preventing rotation of the retaining member until the cranks 21 are removed from the grooves 17. The cranks 21 of the retaining members are adapted to engage bifurcated or slotted ears 23 forming the ends of the plate 7, and said ears have grooves 24 in communication with the slots thereof to receive the cranks 21 of the retaining members. By reference to Fig. 3 it will be noted that the slots or bifurcations of the ears 23 are of sufficient size to receive the retaining members and with said members in a lateral position, the air pump can be easily placed in an operative position relative to the engine shaft and then the retaining members swung to vertical positions simply to prevent the air pump from rotating. With the retaining members in unlocked positions there is sufficient clearance between said members and ears 23 to permit of the air pump being properly positioned on the engine shaft, and such clearance emphasizes the fact that the air pump is solely supported by its operating means.

What I claim is:—

The combination with a chassis element having an opening and an engine shaft opposite said opening, of a pump detachably attached to and supported upon the end of said shaft by means passing loosely through said opening.

In testimony whereof I affix my signature in presence of two witnesses.

SILAS A. STRICKLAND.

Witnesses:
 ANNA M. DORR,
 LEWIS E. FLANDERS.

Copies of this patent may be obtained for five cents each, by addressing the "Commissioner of Patents, Washington, D. C."